May 16, 1967 F. H. JACKSON 3,319,549
PHOTOGRAPHIC APPARATUS FOR RECORDING, PROCESSING, AND
PROJECTING DATA WITH FAST ACCESS TIME
Filed April 13, 1964
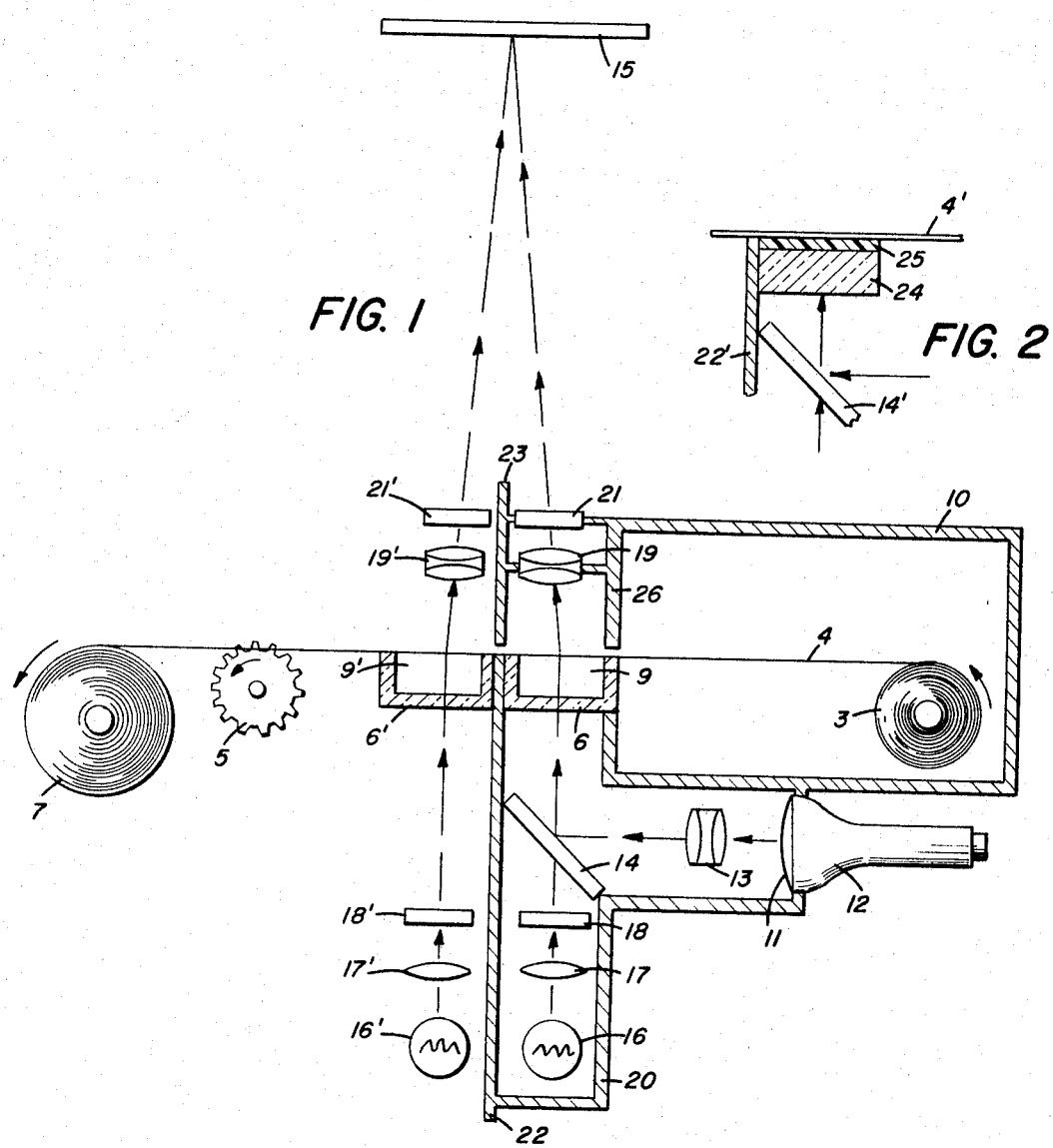
FRANK H. JACKSON
INVENTOR.
BY R. Frank Smith
ATTORNEYS 3,319,549
PHOTOGRAPHIC APPARATUS FOR RECORDING, PROCESSING, AND PROJECTING DATA WITH FAST ACCESS TIME
Frank H. Jackson, Rochester, N.Y., assignor to Eastman Kodak Company, Rochester, N.Y., a corporation of New Jersey
Filed Apr. 13, 1964, Ser. No. 359,183
4 Claims. (Cl. 95—12)

This invention relates generally to a photographic apparatus, and more specifically to an improved photographic apparatus for simultaneously recording, processing and illuminating data for projection onto a screen for rapid visual inspection.

There are occasions in photographic work in which extremenly fast viewing of data is desired; that is, in which it is desired to reduce to a minimum the time interval between the recording of data on a photographic material and the viewing of it. For example, in radar photography, it is necessary to minimize this time interval as much as possible. Photographic apparatus for use in radar photography for recording data on a photographic material at one station, advancing the material to a second station for processing, and subsequent projection of the data on a screen is disclosed in U.S. Patent 2,688,278, C. M. Tuttle, Sept. 7, 1954. Another apparatus of this type for recording data on a photographic material at one station, immediately processing the exposed data at the same station, and advancing the material to a second station for projecting the data on a screen for viewing is disclosed in U.S. Patent No. 2,856,829, C. Orlando, Oct. 21, 1958. Although the prior art devices may operate satisfactorily, a time delay is present as the photographic material is advanced from the recording station to the projecting station. This objectionable time delay is eliminated by applicant's improved photographic apparatus which at one station simultaneously records data on a photographic material in the form of a latent image, processes the latent image to a visible image, and illuminates the visible image for projection onto a screen for viewing. An additional feature of applicant's photographic apparatus is the provision of means for superimposing the image of a previously recorded frame of data upon the image of the data currently being recorded, processed and projected for purposes of comparison.

One of the objects of the present invention is to provide a photographic apparatus which at one station simultaneously records data onto a photographic material in the form of a latent image, processes the latent image, and projects the processed image onto a screen for viewing.

Another object of the invention is to provide a photographic recording and processing apparatus in which the time period between the recording of light data on a film in the form of a latent image, and the processing of the latent image to a visible image is minimized.

Another object of the invention is to provide a photographic apparatus which will superimpose the image of a previously recorded frame of data upon the image of the data currently being recorded, processed and projected.

Another object of the invention is to provide an improved photograhpic apparatus of simple design and construction, thoroughly reliable and efficient in operation, and economical to manufacture.

Objects and advantages other than those set forth above will be apparent from the following description when read in connection with the accompanying drawing, in which:

FIG. 1 is a schematic view of a photographic apparatus constructed in accordance with one embodiment of this invention; and FIG. 2 is a segmental view of a modification of the processing mechanism of the apparatus of FIG. 1.

Referring to the drawing, a photographic apparatus is schematically disclosed having a supply roll 3 of photosensitive photographic web material 4 coated with a silver halide emulsion, some or all of the processing chemicals as well as some water moisture having been incorporated in the web or in an additional layer added thereto. An emulsion of this type is disclosed in French Patent No. 1,257,893, Stewart et al., delivered Feb. 27, 1961. This photographic material 4 has the characteristic which is inherent in many well-known films of being sensitive to certain actinic wavelengths of light and insensitive to non-actinic wavelengths of light. The ranges of the actinic and non-actinic light may vary, depending upon the particular photographic material involved. In one instance, the actinic range may cover wavelengths in the blue and ultra-violet regions of the spectrum, and the non-actinic range may cover wavelengths in the spectrum such as those in the green, red, and infrared regions. This photographic material 4 further produces an image when exposed to actinic radiation, and simultaneously or subsequently subjected to heat by any suitable means such as an appropriate heated liquid and/or vapor combination.

The web 4 of photographic material, which may be a perforated film, is advanced preferably a frame at a time by a sprocket 5 or other suitable means across an open ended transparent processing chamber 6, and onto a take-up roll 7. A heated vapor such as steam, or a heated liquid may be introduced into the cavity 9 of chamber 6 by any suitable means, not shown, for engagement with the emulsion of the web 4 of photographic material as it is transported over chamber 6. In addition to supplying the required heat for processing, these vapors or liquids may react with the constituents of the emulsion to process any latent image thereon, or they may serve as carriers for processing agents if the processing agents are not incorporated in the photographic material. The vapors or liquids, however, must be sufficiently transparent to permit the passage of light therethrough.

Since the web 4 may be sensitive to certain wavelengths of yellow light occurring under normal daylight conditions, it is preferable to house supply roll 3 and the reach of web to the processing chamber in any suitable light-tight housing 10.

The data which is to be recorded on the photographic material may be data appearing on a face 11 of a radar screen at one end of a cathode ray tube 12. The cathode ray tube 12 emits a light image of the data which is focused by a lens unit 13 onto a dichroic mirror 14. Since the mirror is coated to transmit non-actinic wavelengths of light and reflect the actinic wavelengths of the light image, the actinic light image is reflected through transparent chamber 6 onto the emulsion of photographic material 4, forming a latent image thereon which is immediately processed to a visible image by the vapor or liquid. In this regard, although the vapor of liquid in contact with the photographic material 4 will cause some desensitization therein, resulting from the fact that the exposing and processing actions are taking place simultaneously, the material retains sufficient sensitivity so that a latent image is formed upon exposure to the actinic wavelengths of the light image.

A projection system for projecting the visible image onto a viewing screen 15 comprises a lamp 16 mounted below mirror 14, and a lens 17 and filter 18 interposed between lamp 16 and mirror 14. The tube 12, lens unit 13, lamp 16, lens 17 and filter 18 may be mounted in a single housing 20, or in separate housings, not shown. The filter 18 prevents the actinic light from lamp 16 to which web 4 is sensitive from reaching the web, but freely passes the non-actinic light radiation including visible energy to illuminate the processed image. The non-actinic visible light is directed through chamber 6 and photographic material 4 to illuminate the processed image thereon which is projected through a lens unit 19 and filter 21 onto screen 15. The lens unit 19 is a normal focusing unit, and filter 21 prevents actinic light in the external ambient illumination from reaching web 4, but freely passes the non-actinic light used to illuminate the image. The lens unit 19 and filter 21 are preferably mounted in a light-tight housing 16 which may be constructed as a part of housing for the supply roll 3. Accordingly, what applicant has produced is a photographic apparatus which at one station simultaneously records data from a data source onto the emulsion of a frame of photographic material in the form of a latent image, processes the latent image to form a processed image, and projects the processed image onto a screen for viewing.

The photographic apparatus may be provided with a second projection system similar to the above-described projection system, and hence the parts thereof are indicated by the same numerals primed. If desired, baffle plates 22, 23 may be provided to separate the projection systems. The projection systems are spaced apart a predetermined distance so that when one frame of web 4 is at one station in register with chamber 6, the previously recorded frame is at another station in register with succeeding chamber 6'. Chamber 6' may be used to provide an additional processing operation such as fixing, stabilizing, washing, or the like. Accordingly, with this arrangement it is possible to superimpose the projected images from the adjacent frames of photographic material 4 onto screen 15. In order to permit an observer to distinguish between the two projected images on screen 15, the filters 18', 19' of one of the projection systems may be selected having slightly different characteristics that the filters 18, 19 in the other system, thereby being more or less restrictive to light radiation resulting in a change of color of one of the images with respect to the other. The operator may then simultaneously view and compare the previously recorded image with the one currently being recorded.

In FIG. 2, another embodiment of the processing system is disclosed comprising a transparent block 24 of material such as glass coated with a transparent electrical resistance coating 25. In this embodiment, parts similar to previously discussed parts will be denoted by the same numerals primed. The block 24 with its coating 25 and the web 4' are held in intimate face-to-face contact by any suitable means, not shown. The passage of an electrical current through coating 25 produces the heat necessary for processing a latent image on the web 4'.

The invention has been described in detail with particular reference to several embodiments thereof, but it will be understood that further variations and modifications can be effected within the spirit and scope of the invention as described hereinabove and as defined in the appended claims.

I claim:
1. Photographic apparatus for rapidly recording light data on a photosensitive material, and for illuminating and projecting the recorded data onto a viewing screen, comprising:

means for positioning an area of a photosensitive material at an exposing station;

exposing means including a light deflecting means for directing light data on said area of photosensitive material at said station to expose said area, forming a latent image of said data thereon;

means at said station operating simultaneously with said exposing means for treating said area of photographic material at said station, while said area is being exposed, to process said latent image, as it is being formed, to a visible image; and means at said station for directing light through said light deflecting means and operating to illuminate said visible image and project an image thereof onto a viewing screen at the same time that said latent image from which it is derived is being formed and processed simultaneously with said exposing and treating means.

2. Photographic apparatus for rapidly recording light data on successive portions of a photosensitive material transported therethrough, and simultaneously illuminating and projecting an image of the recorded data on two of said portions onto a viewing screen for comparison, comprising:

exposing means including a light deflecting means for directing light data into a first portion of a photosensitive materal, at a first station, to expose said first portion, forming a latent image of said data thereon;

means for treating said first portion of said material at said first station and operating simultaneously with said exposing means for processing said latent image into a visible image while it is being formed;

means for advancing said photosensitive material and said first portion with its visible image to a second station, and a second portion of said material to said first station where said second portion is exposed and processed to a visible image by simultaneous operation of said exposing means and said treating means respectively; and means at said first and second stations operative simultaneously with the formation and processing of an image at said first station for simultaneously directing a beam of light through said image at said first portion, and a beam of light through said light deflecting means, then through said treating means, and then through said image at said second portion, and projecting said images portion onto a screen for comparison purposes.

3. The invention according to claim 2 wherein said illuminating and projecting means for said visible images projects said visible images in superimposed relation.

4. Photographic apparatus for rapidly recording light data from a source onto a photosensitive material which is sensitive to actinic wavelengths of light and insensitive to non-actinic wavelengths of light, and for illuminating the recorded data for projection onto a viewing screen, the combination comprising:

means for positioning an area of said photosensitive material at an exposing station;

exposing means comprising a mirror for reflecting the actinic wavelengths of light from the source of said data onto said area of photosensitive material at said station to expose said area, forming a latent image of said data thereon;

means for treating said material at said station, while said area is being exposed, for processing said latent image, as it is being formed, to a visible image; and visibile-image projecting means comprising a light beam having actinic and non-actinic wavelengths of light, and means for filtering out the actinic wavelengths of light therefrom, said mirror being arranged to pass the non-actinic wavelengths of said light beam therethrough for illuminating said visible image for projection onto said viewing screen.

References Cited by the Examiner

UNITED STATES PATENTS

| | | | |
|---|---|---|---|
| 2,586,772 | 2/1952 | Ashby | 95—14 X |
| 2,688,278 | 9/1954 | Tuttle | 95—14 |
| 3,115,815 | 12/1963 | Friedel | 95—4.5 |
| 3,168,857 | 2/1965 | Hutto | 95—17 |
| 3,200,724 | 8/1965 | Stamm | 95—12 |

FOREIGN PATENTS 1,176,183  11/1958  France.

JOHN M. HORAN, *Primary Examiner.*